6824X
A. Conwell,
Tanning Hides
Patented Nov. 4, 1831.
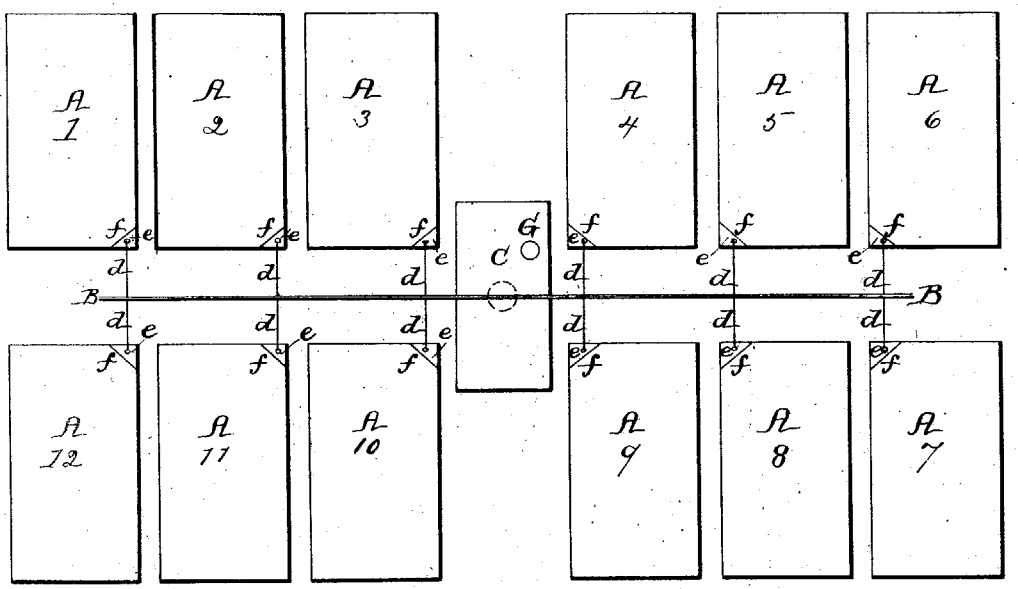
N. PETERS, PHOTO-LITHOGRAPHER, WASHINGTON, D. C.

6824X Nov 4 1831 [illegible]

Abraham Conwell.
Letters Patent. Nov. 4. 1831.

The Schedule referred to in these Letters Patent and making part of the same containing a description in the words of the said Abraham Conwell himself of his Improvement in the Tan Yard.

---

Be it known that I, Abraham Conwell, of the Town of Connersville in the County of Fayette, and State of Indiana, have invented a new and useful improvement in Tanning Leather, and that the following is a full and exact description of the construction and operation of the Tan Yard as improved by me.

Figures A, numbered 1, 2, 3, 4, &c. represent vats of the ordinary size, placed at the common distance apart, but which may be placed at any distance apart to suit the convenience or pleasure of the constructor.

Figure B, is a pipe or conductor placed on a level with the bottom of the vats equi-distant between the rows of vats and passing through the cistern or reservoir C.

Figure C, represents a reservoir or cistern through which the conductor B passes and should be located at the centre of the conductor, and be made so deep below the bottom of the vats as to be capable of receiving at least the contents of one vat upon the mere opening of the pipes. The cistern or reservoir may however be dispensed with by placing a pump in the centre of the conductor B, and inserting the conductor into the pump on each side as represented in the dotted line in the drawing.

Figures d, represent pipes which communicate with the vats and the conductor B, and are inserted at the bottom of the vat level with the conductor.

Figures e, represent cocks or spigots which stop the pipes d, and must be long enough so as to extend from their insertion in the pipes to the top or near the top of the vats so as to be turned without descending into the vats.

Figures f, represent strainers or (as they are denominated by tanners) letch eyes, and are formed by placing an inch plank, twelve inches or less wide, upright extending from the bottom to the top of the vats in the angle, and filled with small holes.

[illegible]

6824X

Figure g represents a pump which is necessary in case the cistern be used
Figure h, represents a cock in the centre of the conductor B and has a spig-
ot extending to the top of the cistern, and is used in drawing the liquor or ooze
from the vats into the cistern.

The advantages to be derived from this invention are first, the ease and
facility by which ooze or liquor can be changed from one vat to another, as for
instance, should it be required to conduct the ooze from vat No. 1, which is full
into vat No. 7 which is empty or simply filled with dry bark, it is only necessary
to turn the spigots in each of those vats, and one half of the ooze or liquor will
be through the conductor conveyed into the vat No. 7, then by stopping the cock in
No. 7 and opening the cock h in the conductor, the balance of the ooze will be
deposited in the cistern (if one be used) and can be raised by the pump and remo-
ved by shutes or hose into No. 7. Secondly, that at any time when ooze in any vat
becomes too weak to suit the hides it can be drawn off and its place be supplied
by stronger ooze without the labor now necessary in removing the hides.
Thirdly, that weak ooze can be drawn off and fresh and stronger applied in free-
zing weather without removing or disturbing the hides. Fourthly, that it leaves
the bark in such a condition in the vats that all its strength can be exhausted
and the tan left perfectly drained and easy of removal. Fifthly, that the tan-
ning of leather will be much facilitated because ooze of any strength can be applied
to hides to suit any stage in their tanning. Sixthly, that much labor now used in
tanning will be saved because the ooze in part removes itself to any vat necessary
in the yard and the balance to the cistern or pump from whence it can be easily
raised and deposited in the vat required.

The inventor claims as new in the annexed drawing and description of
his "Improved Tanyard" the application of the conductors and pipes to the vats as
above shown and specified by the means of which much labor and bark in the
business of tanning is saved because the ooze or liquor is changed and applied at
pleasure without raising the hides or disturbing them.

Witnesses
Saml. C. Sample
Moses Fay
[illegible]

Abraham Cornwell ([illegible])